United States Patent
Takanashi et al.

[11] Patent Number: 5,227,885
[45] Date of Patent: * Jul. 13, 1993

[54] CHARGE LATENT IMAGE RECORDING MEDIUM AND CHARGE LATENT IMAGE READING OUT SYSTEM

[75] Inventors: Itsuo Takanashi, Kamakura; Shintaro Nakagaki, Fujisawa; Hirohiko Shinonaga; Tsutou Asakura, both of Yokohama; Masato Furuya; Hiromichi Tai, both of Yokosuka, all of Japan

[73] Assignee: Victor Company of Japan, Ltd., Yokohama, Japan

[*] Notice: The portion of the term of this patent subsequent to Jul. 31, 2007 has been disclaimed.

[21] Appl. No.: 723,660

[22] Filed: Jun. 26, 1991

Related U.S. Application Data

[63] Continuation of Ser. No. 431,428, Nov. 3, 1989, abandoned.

[30] Foreign Application Priority Data

Nov. 8, 1988 [JP] Japan .................................. 63-281645

[51] Int. Cl.⁵ ..................... H04N 1/028; H04N 1/40; H04N 3/10; H04N 3/15; H04N 5/30; G02F 1/135
[52] U.S. Cl. .............................. 358/209; 358/213.13; 358/225; 358/471; 358/909; 359/71; 359/72; 359/247; 359/250; 359/252; 359/254; 359/255; 365/108; 365/112

[58] Field of Search .............. 358/209, 213.11, 213.13, 358/225, 471, 474, 482, 909; 359/72, 71, 247, 250, 252, 254, 255; 365/108, 112

[56] References Cited

U.S. PATENT DOCUMENTS

| | | | |
|---|---|---|---|
| 3,932,025 | 1/1976 | Lakatos | 365/112 |
| 4,464,451 | 8/1984 | Shirai et al. | 430/65 |
| 4,664,995 | 5/1987 | Horgan et al. | 430/59 |
| 4,920,417 | 4/1990 | Takanashi | 358/213.13 |
| 4,945,423 | 7/1990 | Takanashi | |

Primary Examiner—Benjamin R. Fuller
Assistant Examiner—Scott A. Rogers
Attorney, Agent, or Firm—Lowe, Price, LeBlanc & Becker

[57] ABSTRACT

A charge latent image recording medium includes an electrode, a dielectric member, a member suppressing a transfer of charges, and a photoconductive member laminated in the order without any gaps therebetween. A system for reading a charge latent image recorded in a recording member includes means for projecting a first electromagnetic radiation beam along a path extending to the recording member, means projecting a second electromagnetic radiation beam approximately along the path for reading the charge latent image, guiding means disposed in the path changing electric resistance thereof along the path threthrough, in response to the first electromagnetic radiation beam projected thereto, for guiding an electric field of charges of the charge latent iamge.

9 Claims, 7 Drawing Sheets

CHARGE LATENT IMAGE RECORDING MEDIUM AND CHARGE LATENT IMAGE READING OUT SYSTEM

This application is a continuation; application of application Ser. No. 07/431,428, filed Nov. 3, 1989 now abandoned.

BACKGROUND OF THE INVENTION

This invention relates to a charge latent image recording medium and a charge latent image reading out system.

The applicant previously proposed an imaging system and a recording system in which an imaging apparatus used photo-photo conversion elements to generate an optical image with a high resolution, and the optical image was recorded on a recording medium as a charge latent image by use of photo-charge conversion elements. The applicant also proposed an apparatus for detecting the distribution of a surface potential which was used in reading out the charge latent image from the recording medium and thus generating an electric signal representative of the charge latent image.

SUMMARY OF THE INVENTION

It is an object of this invention to provide an advanced charge latent image recording medium.

It is another object of this invention to provide an advanced charge latent image reading out system.

According to a first aspect of this invention, a charge latent image recording medium comprises an electrode, a dielectric member, a member suppressing a transfer of charges, and a photoconductive member laminated in the order without any gaps therebetween.

According to a second aspect of this invention, a system for reading a charge latent image recorded in a recording member comprises:

a) means for projecting a first electromagnetic radiation beam along a path extending to the recording member, b) means projecting a second electromagnetic radiation beam approximately along the path for reading the charge latent image, c) guiding means disposed in the path changing electric resistance thereof along the path threthrough, in response to the first electromagnetic rradiation beam projected thereto, for guiding an electric field of charges of the charge latent iamge.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
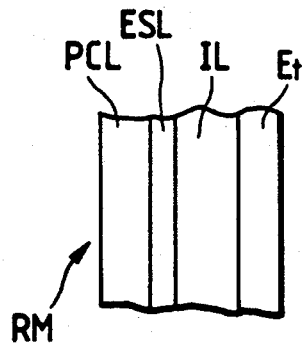
FIG. 1 is a sectional view of a charge latent image recording medium according to a first embodiment of this invention.

FIG. 1 shows a charge latent image recording medium according to a first embodiment of this invention. In the embodiment of FIG. 1, a charge latent image recording medium RM has a laminated structure including a photoconductive layer PCL, a charge transfer suppressive layer ESL, a dielectric layer IL, and a transparent electrode layer Et. These layers PCL, ESL, IL, and Et are united without any gaps therebetween. The charge transfer suppressive layer ESL and the dielectric layer IL are sandwiched between the photoconductive layer PCL and the transparent electrode layer Et. The charge transfer suppressive layer ESL extends between the photoconductive layer PCL and the dielectric layer IL.

The transparent electrode Et is composed of a thin metal film or an electro-conductive film made of $SnO_2$. The photoconductive layer PCL is composed of a thin film of suitable photoconductive material. The dielectric layer IL is made of dielectric material having a high insulating resistance. For example, the dielectric layer IL is composed of a film of high polymer material. The charge transfer suppressive layer ESL is composed of a thin dielectric film designed such that a tunneling current flows through the film due to the tunnel effect when a large electric field is applied to the film. For example, the charge transfer suppressive layer ESL is composed of a thin film of silicon dioxide or aluminum oxide.

During the fabrication of the charge latent image recording medium RM, the charge transfer suppressive layer ESL, the photoconductive layer PCL, and the transparent electrode layer Et are sequentially formed on the dielectric layer IL by a vapor deposition process or a sputtering process.

The charge latent image recording medium RM takes a shape of a disc, a sheet, a tape, a card, or others.

Figure 3:
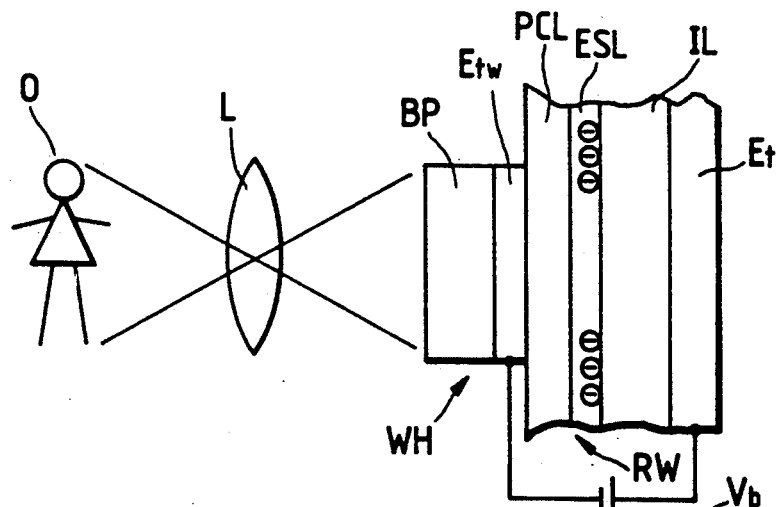
FIG. 3 is a diagram of a recording system including the recording medium of FIG. 1.

FIG. 3 shows a system for recording a charge latent image on a recording medium of FIG. 1. With reference to FIG. 3, an optical image of an object O is focused by a lens L on the photoconductive layer PCL of the recording medium RM through a writing head WH. The writing head WH includes a transparent base plate BS and a transparent electrode layer Etw. The transparent electrode layer Etw is fixed to and supported by the transparent base plate BS without any gap therebetween. The transparent electrode layer Etw opposes the photoconductive layer PCL of the recording medium RM. The negative terminal of a dc power supply Vb is electrically connected to the transparent electrode layer Etw of the writing head WH. The positive terminal of the dc power supply Vb is electrically connected to the transparent electrode layer Et of the recording medium RM. The dc power supply Vb and the electrodes Et and Etw function to apply an electric field to the photoconductive layer PCL of the recording medium RM.

Under conditions where an optical image of the object O is focused on the photoconductive layer PCL of the recording medium RM, the electric resistance of the photoconductive layer PCL varies with an intensity of the optical image of the object O. Since the electric field in the photoconductive layer PCL depends on the electric resistance of the photoconductive layer PCL, the electric field in the photoconductive layer PCL varies with the two dimensional intensity distribution of the optical image of the object O. The electric charges move toward the positive potential transparent electrode layer Et through the charge transfer suppressive layer ESL due to the tunnel effect in dependence upon the electric field in the photoconductive layer PCL. As a result of this movement of electric charges, a charge latent image corresponding to the optical image of the object O is formed at the boundary between the charge transfer suppressive layer ESL and the dielectric layer IL. Since the charge latent image is surrounded by the charge transfer suppressive layer ESL and the dielectric layer IL, the charge latent image can be held stably for a long period of time.

DESCRIPTION OF THE SECOND PREFERRED EMBODIMENT

Figure 2:
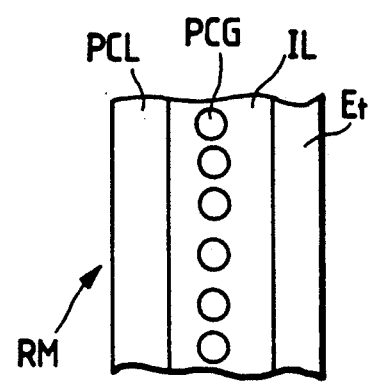
FIG. 2 is a sectional view of a charge latent image recording medium according to a second embodiment of this invention.

FIG. 2 shows a charge latent image recording medium according to a second embodiment of this invention. The embodiment of FIG. 2 is similar to the embodiment of FIG. 1 except for designs indicated hereinafter.

In the embodiment of FIG. 2, a charge latent image recording medium RM has a laminated structure including a photoconductive layer PCL, a dielectric layer IL, and a transparent electrode layer Et. These layers PCL, IL, and Et are united without any gaps therebetween. The dielectric layer IL is sandwiched between the photoconductive layer PCL and the transparent electrode layer Et. The dielectric layer IL contains an internal layer having particles or corpuscles PCG of photoconductor.

The dielectric layer IL is formed as follows. A first dielectric layer having a high insulating resistance is prepared. Photoconductor particles PCG are distributed on and fixed to a surface of the first dielectric layer in a suitable process. For example, photoconductor particles PCG are deposited on the surface of the first dielectric layer by a vapor deposition process or a sputtering process using a suitable mask pattern. It is preferable that the photoconductor particles PCG separate from each other. The first dielectric layer on which the photoconductor particles PCG are deposited is further coated with a second dielectric layer having a high insulating resistance. The first dielectric layer and the second dielectric layer will adjoin the transparent electrode layer Et and the photoconductive layer PCL respectively. The second dielectric layer is composed of a thin film designed such that a tunneling current can flow through the film under predetermined conditions. For example, the second dielectric layer is composed of a thin film of silicon dioxide or aluminum oxide. It is preferable that the first and the second dielectric layers are made of the same materials.

Figure 4:
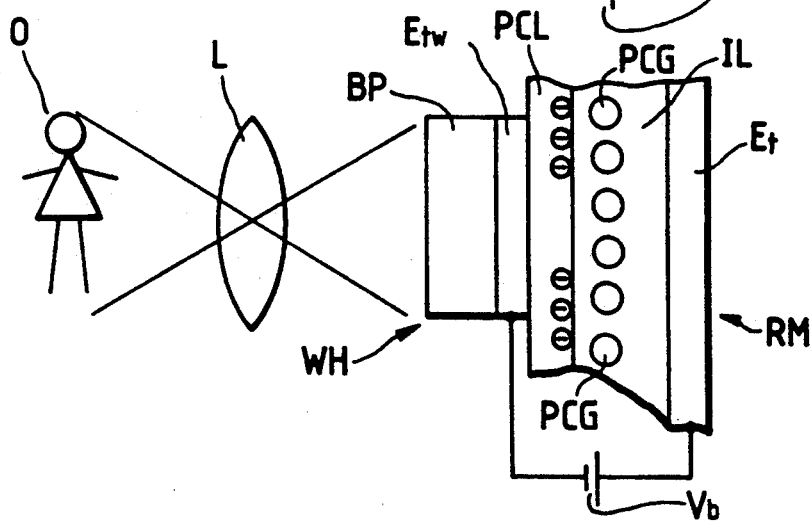
FIG. 4 is a diagram of a recording system including the recording medium of FIG. 2.

FIG. 4 shows a system for recording a charge latent image on the recording medium RM of FIG. 2. The recording system of FIG. 4 is similar to the recording system of FIG. 3 except for designs indicated hereinafter. With reference to FIG. 4, an optical image of an object O is focused by a lens L on the photoconductive layer PCL of the recording medium RM through a writing head WH. Under conditions where an optical image of the object O is focused on the photoconductive layer PCL of the recording medium RM, the electric resistance of the photoconductive layer PCL varies with the intensity of the optical image of the object O. Since the electric field in the photoconductive layer PCL depends on the electric resistance of the photoconductive layer PCL, the electric field in the photoconductive layer PCL varies with the intensity distribution of the optical image of the object O. A primary charge latent image corresponding to the optical image of the object O is formed at the boundary between the photoconductive layer PCL and the dielectric layer IL in response to the electric field in the photoconductive layer PCL.

Figure 5A:
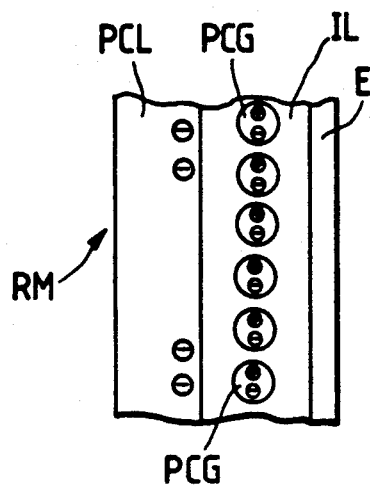
FIG. 5(a) and FIG. 5(b) are sectional views of the recording medium of FIG. 4.
Figure 5B:
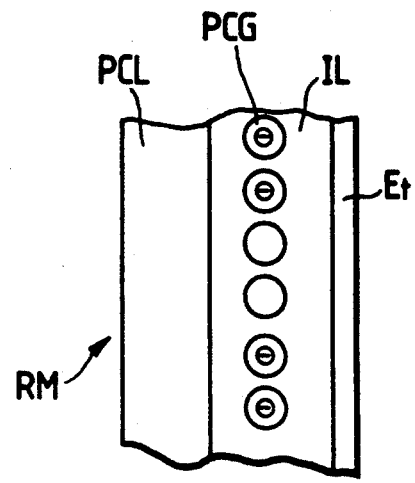

As shown in FIG. 5(a) in which the recording system of FIG. 4 is not shown, when light is applied to the photoconductor particles PCG in the dielectric layer IL from a light source Lw via the transparent electrode layer Et, electron-hole pairs are generated in the photoconductor particles PCG. The electrons forming the primary charge latent image are attracted to move from the photoconductive layer PCL into the photoconductor particles PCG through the front walls of the dielectric layer IL by the electric field existing between the negative electrons and the transparent electrode Et. The tunnel effect enables the electrons getting into the dielectric layer IL. As shown in FIG. 5(b), the electrons moved into the dielectric layer IL neutralize the holes of the electron-hole pairs so that only the electrons of the electron-hole pairs remain in the photoconductor particles PCG. The remaining electrons form a secondary charge latent image corresponding to the primary charge latent image. In this way, the layer of photoconductor particles PCG is charged with distributed negative potentials representing a secondary charge latent image. Since the secondary charge latent image is surrounded by the walls of the dielectric layer IL, the secondary charge latent image can be held stably for a long period of time.

It is preferable that the photoconductive layer PCL is made of material which exhibits an effective photoconductivity responsive to visible light, and that the photoconductor particles PCG are made of material which exhibits an effective photoconductivity responsive to invisible light such as infrared light.

DESCRIPTION OF THE THIRD PREFERRED EMBODIMENT

Figure 6:
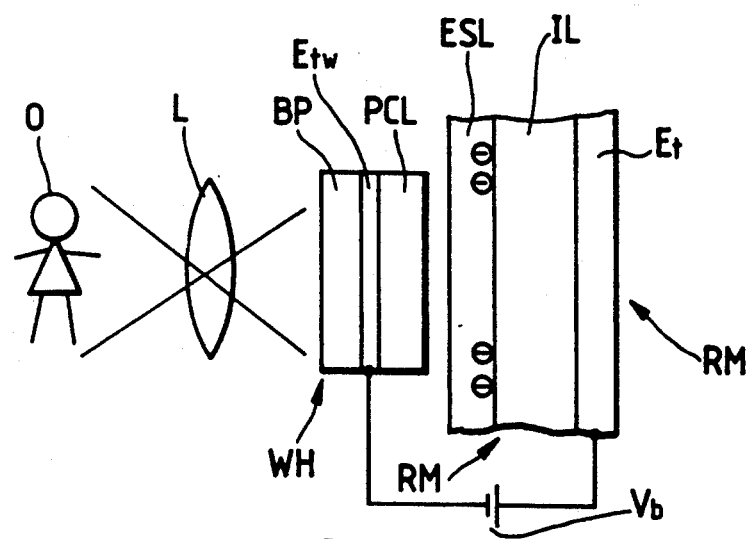
FIG. 6 is a diagram of a recording system according to a third embodiment of this invention.

FIG. 6 shows a third embodiment of this invention which is similar to the embodiment of FIGS. 1 and 3 except for designs indicated hereinafter. With reference to FIG. 6, a recording medium RM has a laminated structure including a charge transfer suppressive layer ESL, a dielectric layer IL, and a transparent electrode layer Et. These layers ESL, IL, and Et are united without any gaps therebetween. A writing head WH has a laminated structure including a base plate BP, a transparent electrode layer Etw, and a photoconductive layer PCL. These layers BP, Etw, and PCL are united without any gaps therebetween. The photoconductive layer PCL of the writing head WH opposes the charge transfer suppressive layer ESL of the recording medium RM.

An optical image of an object O is focused by a lens L on the photoconductive layer PCL of the writing head WH. The electric resistance of the photoconductive layer PCL varies with the intensity distribution of the optical image of the object O. Since the electric field in the photoconductive layer PCL depends on the electric resistance of the photoconductive layer PCL, the electric field in the photoconductive layer PCL varies with the intensity distribution of optical image of the object O. Through arcing taking place in a narrow gap between the photoconductive layer PCL and the charge transfer suppressive layer ESL, the electric field in the photoconductive layer PCL causes a primary charge latent image, corresponding to the optical image of the object O, being formed on the surface of the charge transfer suppressive layer ESL of the recording medium RM. Due to the tunnel effect, the charges forming the primary charge latent image move through the charge transfer suppressive layer ESL by being attracted to the positive potential electrode Etw, so that a secondary charge latent image corresponding to the primary charge latent image is formed at the boundary between the charge transfer suppressive layer ESL and the transparent electrode layer Et as shown in FIG. 6.

DESCRIPTION OF THE FOURTH PREFERRED EMBODIMENT

Figure 7:
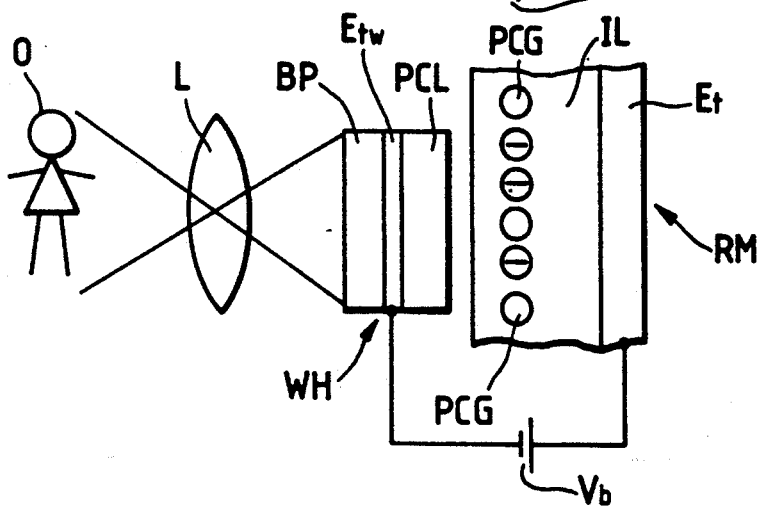
FIG. 7 is a diagram of a recording system according to a fourth embodiment of this invention.

FIG. 7 shows a fourth embodiment of this invention which is similar to the embodiment of FIGS. 2, 4, 5(a), and 5(b) except for designs indicated hereinafter. With reference to FIG. 7, a recording medium RM has a laminated structure including a dielectric layer IL and a transparent electrode layer Et. These layers IL and Et are united without any gap therebetween. A writing head WH has a laminated structure including a base plate BP, a transparent electrode layer Etw, and a photoconductive layer PCL. These layers BP, Etw, and PCL are united without any gaps therebetween. The photoconductive layer PCL of the writing head WH opposes the dielectric layer IL of the recording medium RM.

An optical image of an object O is focused by a lens L on the photoconductive layer PCL of the writing head WH. The electric resistance of the photoconductive layer PCL varies with the intensity distribution of the optical image of the object O. Since the electric field in the photoconductive layer PCL depends on the electric resistance of the photoconductive layer PCL, the electric field in the photoconductive layer PCL varies with the intensity distribution of the optical image of the object O. In the same manner explained for the arrangement of FIG. 6, a primary charge latent image, corresponding to the optical image of the object O, is formed on the surface of the dielectric layer IL of the recording medium RM in response to the electric field in the photoconductive layer PCL of the writing head WH.

When light is applied to photoconductor particles PCG in the dielectric layer IL from a light source Lw via the transparent electrode layer Et similar to the arrangement shown in FIG. 5(a), electron-hole pairs are generated in the photoconductor particles PCG. Thus the electrons forming the primary charge latent image are neutralized by the holes which move to the front walls of the dielectric layer IL by the electric field existing between the electrons and the transparent electrodes Et. The tunnel effect enables the electrons getting into the dielectric layer IL. As shown in FIG. 5(b), after the holes of the electron-hole pairs are neutralized, only the electrons of the electron-hole pairs remain in the dielectric layer IL. The remaining electrons form a secondary charge latent image corresponding to the primary charge latent image. In this way, the photoconductor particles PCG have negative potentials representing a secondary charge latent image.

DESCRIPTION OF THE FIFTH PREFERRED EMBODIMENT

Figure 8:
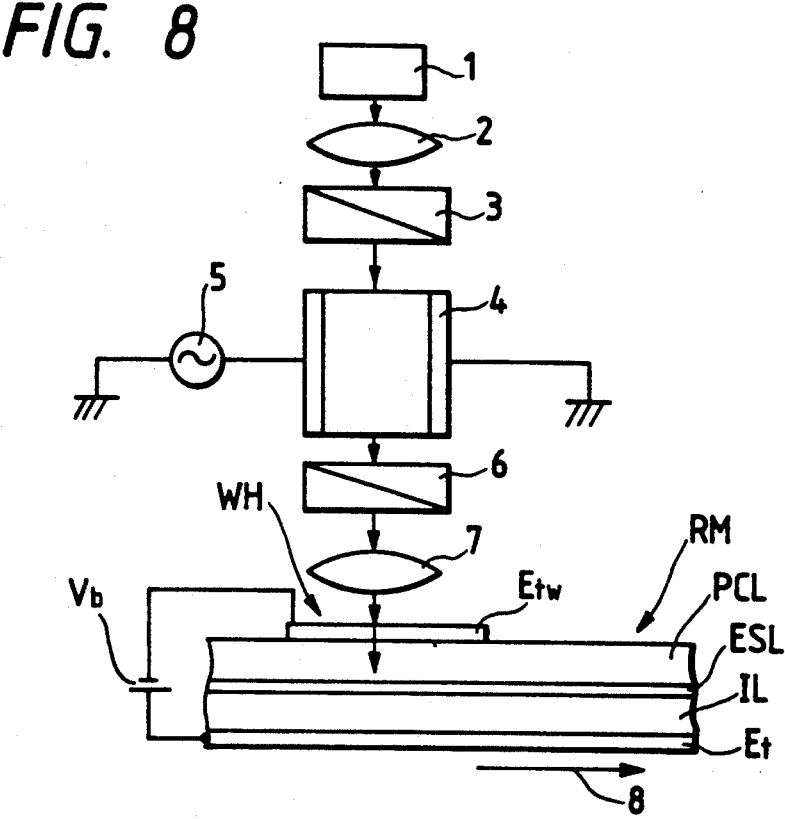
FIG. 8 is a diagram of a recording system according to a fifth embodiment of this invention.

FIG. 8 shows a fifth embodiment of this invention which is similar to the embodiment of FIGS. 1 and 3 except for designs indicated hereinafter. With reference to FIG. 8, a recording medium RM is disc-shaped, and is rotated in the direction denoted by the arrow 8 by a suitable drive mechanism (not shown) at a predetermined speed.

A laser 1 emits a beam of light toward a light modulator 4 via a lens 2 and a polarizer 3. An information signal source 5 outputs a signal representative of information to the light modulator 4. The light modulator 4 modulates the laser light beam in accordance with the information represented by the signal from the information signal source 5. In this way, the information is carried on the laser light beam. The modulated laser light beam is applied from the light modulator 4 to a photoconductive layer PCL of the recording medium RM via an analyzer 6, a lens 7, and a writing head WH. A base plate BP (see FIGS. 1 and 3) is omitted from FIG. 8 for the clarity.

Under conditions where the laser light beam is applied to the photoconductive layer PCL of the recording medium RM, the electric resistance of the photoconductive layer PCL varies with the information represented by the modulated laser light beam. Since the electric field in the photoconductive layer PCL depends on the electric resistance of the photoconductive layer PCL, the electric field in the photoconductive layer PCL varies with the information carried by the modulated laser light beam. An electric chrges move toward the transparent electrode layer Et through the charge transfer suppressive layer ESL due to the tunnel effect in dependence upon the electric field in the photoconductive layer PCL. As a result of this movement of charges, a charge latent image corresponding to the information on the laser light beam is formed at the boundary between the charge transfer suppressive layer ESL and the dielectric layer IL.

DESCRIPTION OF THE SIXTH PREFERRED EMBODIMENT

Figure 9:
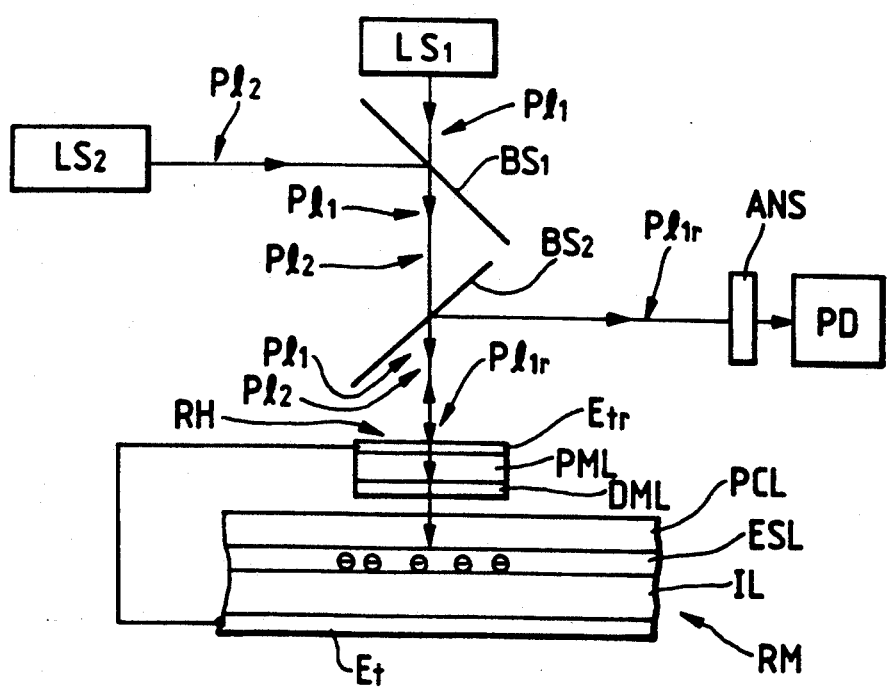
FIG. 9 is a diagram of a reading system according to a sixth embodiment of this invention.

FIG. 9 shows a charge latent image reading out system according to a sixth embodiment of this invention. With reference to FIG. 9, a reading head RH includes a laminated body having a transparent electrode layer Etr, a photo-modulation layer PML, and a dielectric mirror layer DML. The photo-modulation layer PML is sandwiched between the transparent electrode layer Etr and the dielectric mirror layer DML. The photo-modulation layer PML is made of material such as a single crystal of lithium niobate or nematic liquid crystal. The dielectric mirror layer DML opposes the photoconductive layer PCL of the recording medium RM of FIG. 1. The transparent electrode layer Etr is electrically connected to the transparent electrode layer Et of the recording medium RM.

A laser light source LS1 emits a laser light beam Pl1 which has a given polarization plane. The emitted laser light beam Pl1 travels to the reading head RH via beam splitters BS1 and BS2. After the laser light beam Pl1 passes through the transparent electrode Etr and the photo-modulation layer PML of the reading head RH, the laser light beam Pl1 is reflected by the dielectric mirror layer DML of the reading head RH and forms a reflected laser light beam Pl1r. The reflected laser light beam Pl1r passes through the photo-modulation layer PML and the transparent electrode Etr and then exits from the reading head RH. After the reflected laser light beam Pl1r exits from the reading head RH, the light beam Pl1r travels toward the beam splitter BS2 and is again reflected by the beam splitter BS2 toward an analyzer ANS. The laser light beam Pl1r passes through the analyzer ANS and then enters a photoelectric converter (a photo detector) PD. The laser light beam Pl1r is converted by the photoelectric converter PD into a corresponding electric signal.

While the laser light beams Pl1 and Pl1r pass through the photo-modulation layer PML, the polarization plane of the laser light beam Pl1r is modulated by the photo-modulation layer PML in accordance with an electric field applid form the charge latent image on the recording medium RM. Accordingly, the modulated polarization plane of the laser light beam Pl1r outputted from the reading head RH represents the charge latent image. The modulated polarization plane of the laser light beam Pl1r is detected by the analyzer ANS to produce an intensity modulated light beam, which is in turn converted by the photoelectric converter PD into an amplitude modulated electrical singal reenting the charge latent image.

A laser light source LS2 emits a laser light beam Pl2 of a small diameter toward the beam splitter BS1. After the laser light beam Pl2 is reflected by the beam splitter BS1, the laser light beam Pl2 advances to the reading head RH through the beam splitter BS2. As the wavelength of the laser light beam Pl2 is different from the one of the laser light beam Pl1 and the dielectric mirror layer DML in this embodiment is wavelength selective, the dielectric mirror layer DML allows to pass the laser light, which in turn reaches the photoconductive layer PCL of the recording medium RM. In this way, the photoconductive layer PCL of the recording medium RM is exposed to a small spot of the laser light beam Pl2. Generally, the laser light sources LS1 and LS2 are activated simultaneously.

Figure 17:
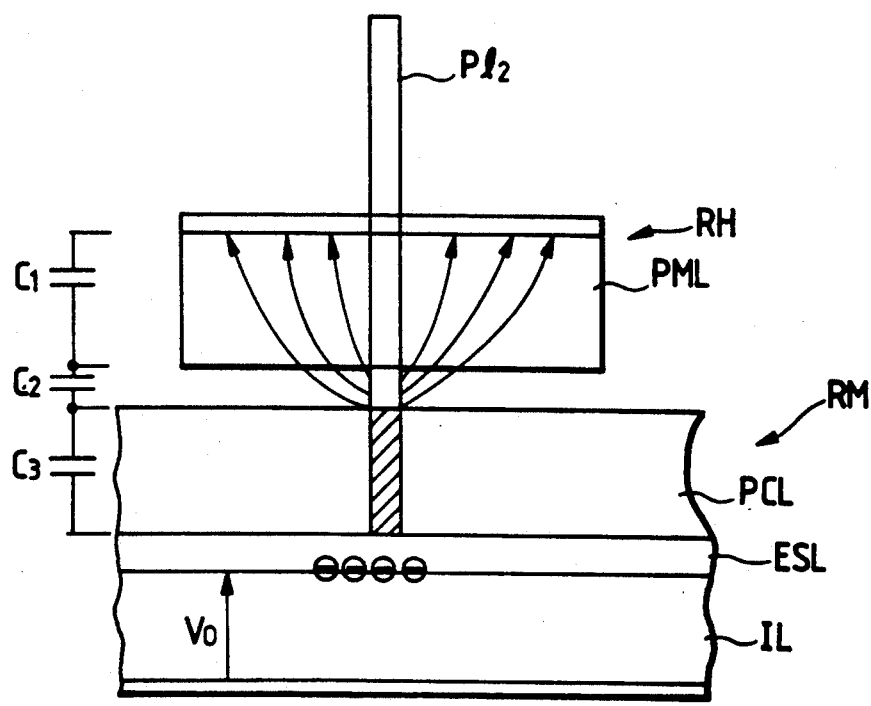
FIG. 17 is a diagram of the recording medium and the reading head of the embodiment of FIG. 9.

As shown in the left-hand part of FIG. 17, an equivalent circuit of the combination of the photo-modulation layer PML of the reading head RH and the photoconductive layer PCL of the recording medium RM includes a series connection of a capacitor C1 across the photo-modulation layer PML, a capacitor C2 between the photo-modulation layer PML and the photoconductive layer PCL, and a capacitor C3 across the photoconductive layer PCL. It should be noted that the dielectric mirror layer DML (see FIG. 9) is omitted from FIG. 17 for the clarity. The capacitors C1-C3 divide the potential Vo of the charge latent image into parts, one of which acts on the photo-modulation layer PML as a divided potential V. The capacitance of the capacitor C3 is chosen so as to be much smaller than the capacitances of the capacitors C1 and C2 in the absence of the spot of the laser light beam Pl2 on the photoconductive layer PCL. Therefore, almost no electric field is applied to the photo-modulation layer PML in the absence of the spot of the laser light beam Pl2 on the photoconductive layer PCL. When the spot of the laser light beam Pl2 is applied to the photoconductive layer PCL, the electric resistance of the portion of the photoconductive layer PCL which is exposed to the spot of the laser light beam Pl2 is reduced. In FIG. 17, the resistance-reduced portion of the photoconductive layer PCL is illustrated as the hatched region. Because of the resistance-reduced portion, the electric field of the charges limited directly below the portion and on the dielectric layer IL, distribute as if the limited charges are located at the top of the resistance-reduced poriton as shown by arrows, and the area of the photo-modulation layer PML adjacent to the path of the laser light beam Pl2 is subject to this electric field which is originated from the limited charges directly below the resistance-reduced portion. The reading layer light beam Pl1 is directed approximately along the path of the laser light beam Pl2 but not necessarily being coaxial with it, so that the laser beam Pl1 lands in the neighborhood of the spot of the laser beam Pl2 on the recording head RH. This arrangement enables the reading laser light beam Pl1 reading mostly the limited charges and being less subjected to adjacent charges which are not directly below the reduced-resitance portion on the dielectric layer IL. Accordingly the output laser light beam Pl1r from the reading head RH precisely represents the portion of the charge latent image which resides directly below the resistance-reduced portion of the photoconductive layer PCL. As understood from the foregoing description, a high resolution image reproduction is ensured in the reading operation of the charge latent image.

A conventional means (not shown) enables a two-dimensional charge latent image reading from the recording medium RM by scanning. A first example of the conventional means includes a beam deflector (not shown) which deflects two-dimensionally the laser light beams Pl1 and Pl2 to scan the charge latent image. A second example of the conventional means includes a beam deflector (not shown) deflecting linearly the laser light beams Pl1 and Pl2, and a drive mechanism (not shown) moving the recording medium relative to the reading head RH in a direction perpendicular to the direction of the linear deflection of the laser light beams Pl1 and Pl2.

The wavelengths of the laser light beams Pl1 and Pl2 are chosen so as to differ from each other. The dielectric mirror layer DML has a wavelength selectivity to reflect the laser light beam Pl1 but allows to pass the other laser light beam Pl2. The laser light beams Pl1 and Pl2 are directed so as to travel along approximately the same paths extending from the beam splitter BS1 to the dielectric mirror layer DML of the reading head RH.

Figure 10:
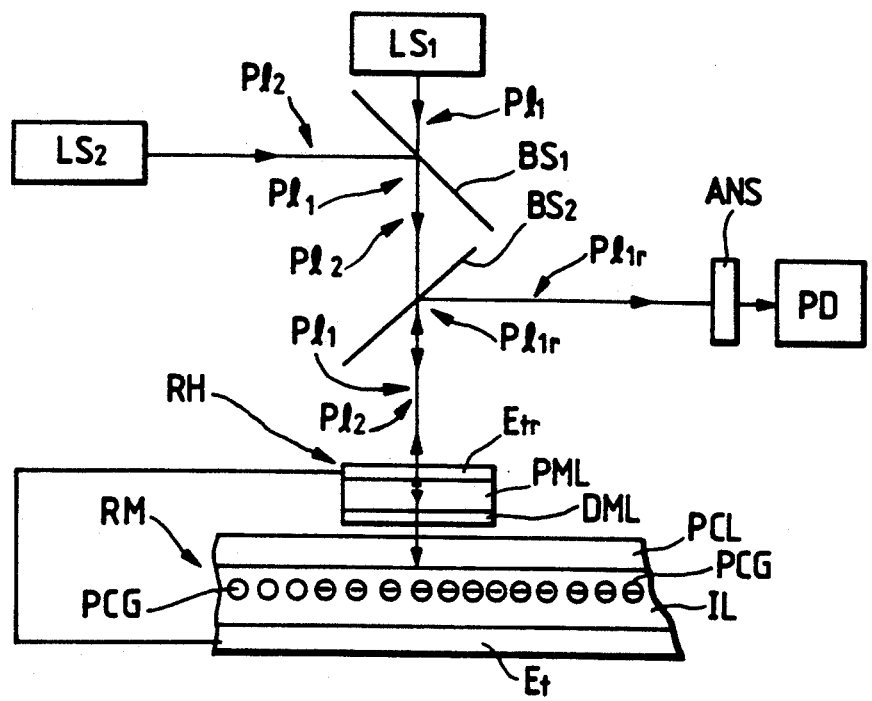
FIG. 10 is a diagram of a reading system according to a first modification of the embodiment of FIG. 9.

FIG. 10 shows a first modification of the embodiment of FIG. 9. In this modification, the recording medium RM of FIG. 2 is used in place of the recording medium RM of FIG. 1. The operation of the system of FIG. 10 is similar to the operation of the system of FIG. 9.

Figure 11:
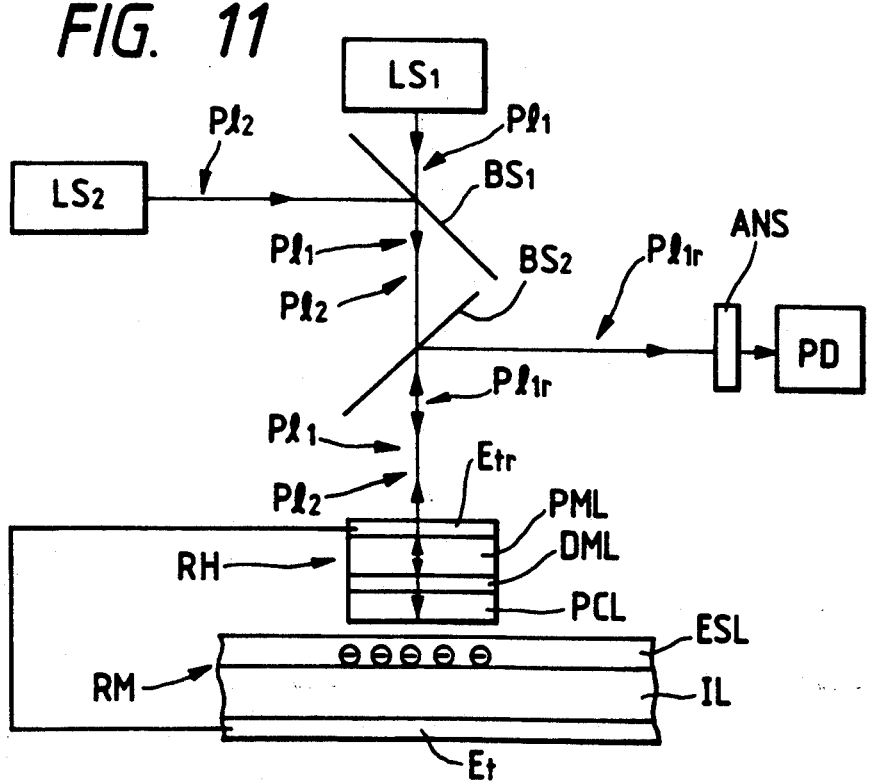
FIG. 11 is a diagram of a reading system according to a second modification of the embodiment of FIG. 9.

FIG. 11 shows a second modification of the embodiment of FIG. 9. In this modification, the recording medium RM of FIG. 6 is used in place of the recording medium RM of FIG. 1, and a photoconductive layer PCL is fixedly overlaid upon the dielectric mirror layer DML of the reading head RH. The operation of the system of FIG. 11 is similar to the operation of the system of FIG. 9.

Figure 12:
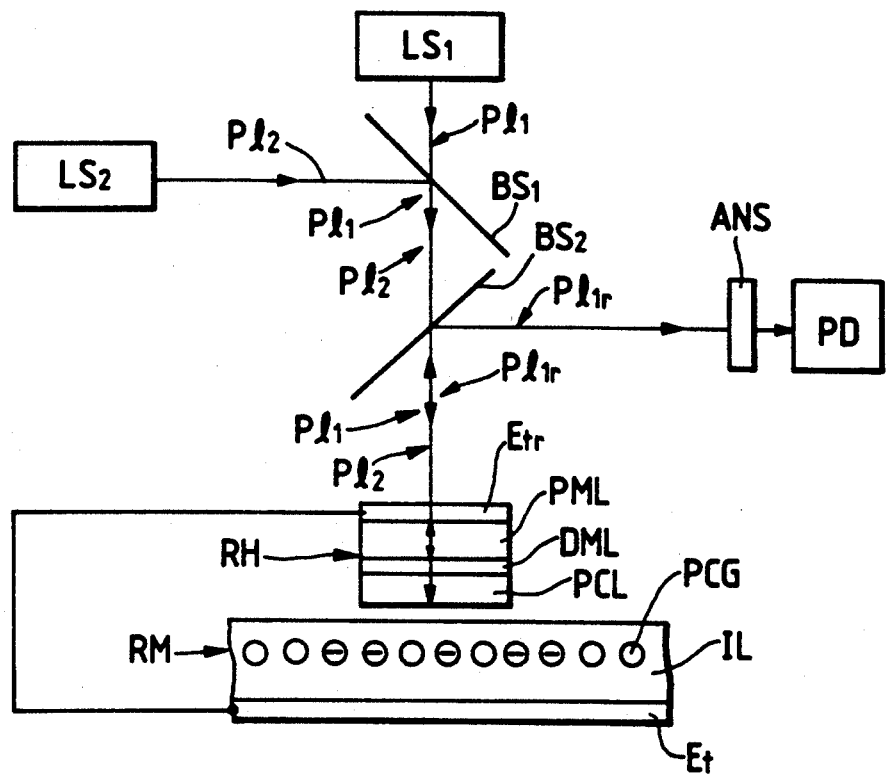
FIG. 12 is a diagram of a reading system according to a third modification of the embodiment of FIG. 9.

FIG. 12 shows a third modification of the embodiment of FIG. 9. In this modification, the recording medium RM of FIG. 7 is used in place of the recording medium RM of FIG. 1, and a photoconductive layer PCL is fixedly overlaid upon the dielectric mirror layer DML of the reading head RH. The operation of the system of FIG. 12 is similar to the operation of the system of FIG. 9.

In a fourth modification of the embodiment of FIG. 9, which is similar thereto, the dielectric mirror layer DML of the reading head RH is composed of a semi-transparent mirror. This modification has only a single laser light source. A portion of the single laser light beam is reflected by the dielectric mirror layer DML, while the rest of the laser light beam passes through the dielectric mirror layer DML and reaches the photoconductive layer PCL of the recording medium RM to form a light beam spot on the photoconductive layer PCL. The reflected laser light beam is detected by the photoelectric converter PD. The laser light beam which passes through the dielectric mirror layer DML is used to decrease the electric resistance of a portion of the photoconductive layer PCL.

In a fifth modification of the embodiment of FIG. 9, which is simiar thereto, the photo-modulation layer PML is composed of a liquid crystal, and the laser light source LS2 outputs pulses of a laser light beam to irradiate the photo-conductive layer PCL pulsively. In this modification, the photo-modulation layer PML is exposed to a pulsating electric field.

DESCRIPTION OF THE SEVENTH PREFERRED EMBODIMENT

Figure 13:
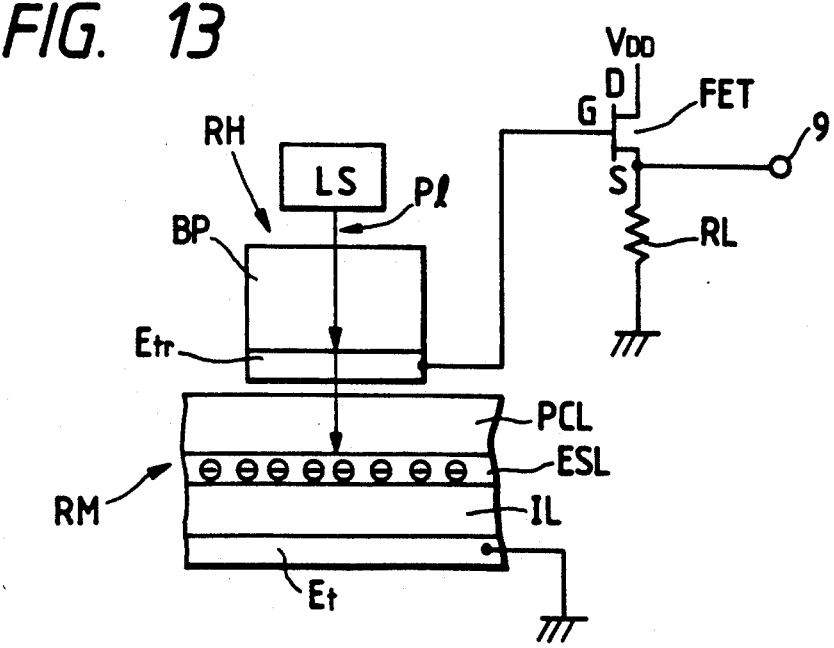
FIG. 13 is a diagram of a reading system according to a seventh embodiment of this invention.

FIG. 13 shows a charge latent image reading out system according to a seventh embodiment of this invention. With reference to FIG. 13, a reading head RH includes a transparent base plate BP and a transparent electrode layer Etr. The transparent electrode layer Etr is fixedly overlaid upon the base plate BP without any gap therebetween. The transparent electrode layer Etr is opposed to the photoconductive layer PCL of the recording medium RM of FIG. 1. The electrode layer Etr is electrically connected to the gate of a field-effect transistor FET. The drain of the transistor FET is connected to the positive terminal of a dc power supply VDD. The negative terminal of the power supply is grounded. The source of the transistor FET is grounded via a load resistor RL. The junction between the FET and the load resistor RL is connected to an output terminal 9. The electrode layer Et of the recording medium is grounded.

A laser light source LS emits a laser light beam Pl of a small diameter toward the reading head RH. The emitted laser light beam Pl passes through the reading head RH and then reaches the photoconductive layer PCL of the recording medium RM. Thus, the photoconductive layer PCL of the recording medium RM is exposed to a small spot of the laser light beam Pl. As in the embodiment of FIGS. 9 and 17, when the spot of the laser light beam Pl is applied to the photoconductive layer PCL, the electric resistance of the portion of the photoconductive layer PCL which is exposed to the spot of the laser light beam Pl is reduced. The electric field is efficiently guided by the resistance-reduced portion of the photoconductive layer PCL to the transparent electrode layer Etr from the portion between the charge transfer suppressive layer ESL and the dielectric layer IL which extends directly below the resistance-reduced portion of the photoconductive layer PCL. Accordingly, a potential which is electrostatically induced on the electrode layer Etr accurately represents the portion of the charge latent image which extends directly below the resistance-reduced portion of the photoconductive layer PCL. The transistor FET generates a signal in accordance with the induced potential on the electrode layer Etr thus an amplitude modulated signal it fed to the output terminal 9. As understood from the previous description, portions of the charge latent image which are located out of the region directly below the resistance-reduced portion of the photoconductive layer PCL do not disturb the potential on the electrode layer Etr to be picked up, so that a high resolution pickup is ensured in the detection of the charge latent image.

A conventional means (not shown) enables a two-dimensional charge latent image reading from the recording medium RM by scanning. A first example of the conventional means includes a beam deflector (not shown) which deflects two-dimensionally the laser light beam Pl to scan the charge latent image. A second example of the conventional means includes a beam deflector (not shown) deflecting linearly the laser light beam Pl, and a drive mechanism (not shown) moving the recording medium RM relative to the reading head RH in a direction perpendicular to the direction of the linear deflection of the laser light beam Pl.

Figure 14:
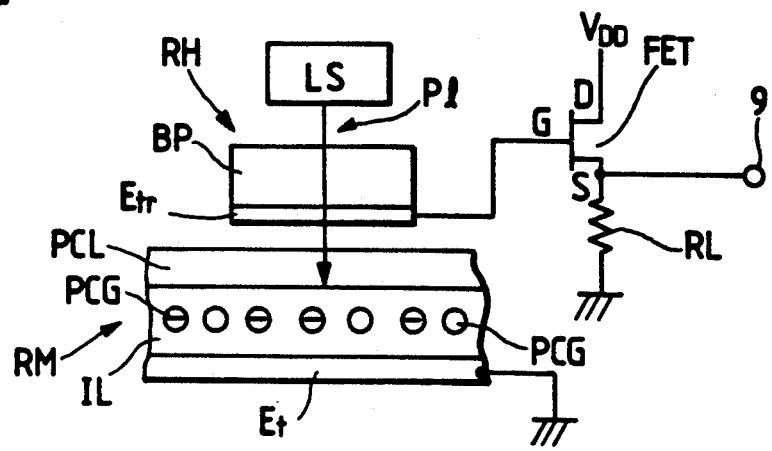
FIG. 14 is a diagram of a reading system according to a first modification of the embodiment of FIG. 13.

FIG. 14 shows a first modification of the embodiment of FIG. 13. In this modification, the recording medium RM of FIG. 2 is used in place of the recording medium RM of FIG. 1. The operation of the system of FIG. 14 is similar to the operation of the system of FIG. 13.

Figure 15:
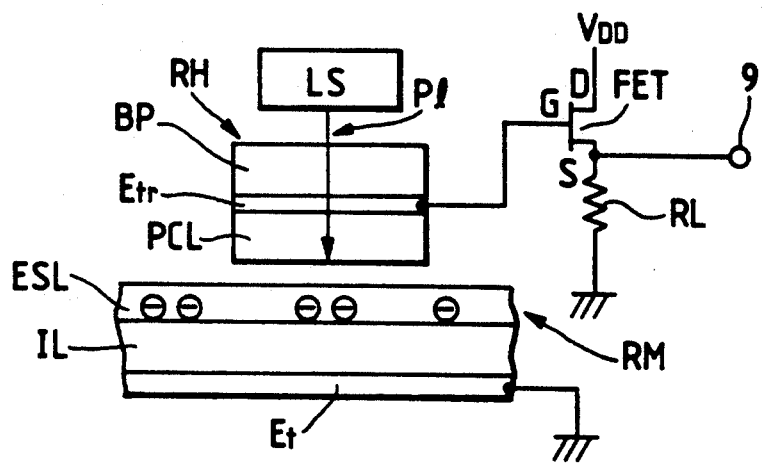
FIG. 15 is a diagram of a reading system according to a second modification of the embodiment of FIG. 13.

FIG. 15 shows a second modification of the embodiment of FIG. 13. In this modification, the recording medium RM of FIG. 6 is used in place of the recording medium RM of FIG. 1, and a photoconductive layer PCL is fixedly overlaid upon the transparent electrode layer Etr of the reading head RH. The operation of the system of FIG. 15 is similar to the operation of the system of FIG. 13.

Figure 16:
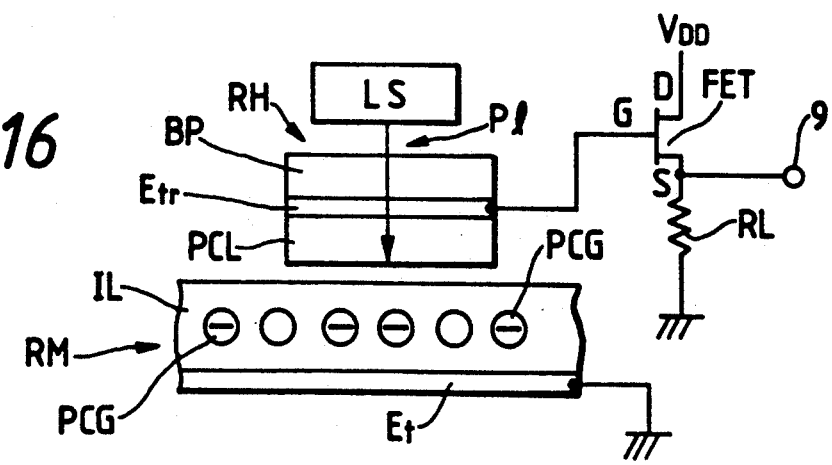
FIG. 16 is a diagram of a reading system according to a third modification of the embodiment of FIG. 13.

FIG. 16 shows a third modification of the embodiment of FIG. 13. In this modification, the recording medium RM of FIG. 7 is used in place of the recording medium RM of FIG. 1, and a photoconductive layer PCL is fixedly overlaid upon the transparent electrode layer Etr of the reading head RH. The operation of the system of FIG. 16 is similar to the operation of the system of FIG. 13.

A fourth modification of the embodiment of FIG. 13 obtains a resultant detection signal on the basis of the difference component between first and second output signals from the transistor FET which are generated with and the without the irradiation of laser light beam Pl respectively.

In a fifth modification of the embodiment of FIG. 13, the dimension of the reading head may be made small enough to just allow passing the laser light beam Pl, and the recording head RH is moved relative to the recording medium RM to scan the charge latent image on the recording medium RM.

What is claimed is:

1. A system for reading out a charge image from a recording medium previously subjected to a recording process, the recording medium having at least an electrode and a dielectric layer member, the system comprising:

a reading head for reading out an intensity of an electric field which is generated on a basis of a charge image representing an object to be reproduced in connection with the recording medium;

a photoconductive layer disposed between the reading head and the recording medium; and an electromagnetic radiation beam applying means for applying an electromagnetic radiation beam of a small diameter to the photoconductive layer, and for feeding an electric field of the charge image of the recording medium, which corresponds to a beam-applied portion of the photoconductive layer, to the reading head.

2. The system of claim 1 wherein the photoconductive layer and the reading head are laminated with each other.

3. The system of claim 1 wherein the photoconductive layer and the recording medium are laminated with each other.

4. The system of claim 1 wherein the reading head comprises a photo-modulation member, and a dielectric mirror for conducting a portion of the electromagnetic radiation beam and reflecting another portion of the electromagnetic radiation beam, whereby the charge image recording on the recording medium is read out as optical information.

5. The system of claim 4 wherein the electromagnetic radiation beam applying means comprises a first electromagnetic radiation beam applying means for applying a first electromagnetic radiation beam, and a second electromagnetic radiation beam applying means for applying a second electromagnetic radiation beam; and wherein the dielectric mirror conducts the first electromagnetic radiation beam and reflects the second electromagnetic radiation beam.

6. The system of claim 1 wherein the reading head comprises an electrode for an electrostatic detection, and the charge image recorded on the recording medium is read out via the electrostatic detection electrode as voltage information.

7. A system for reading out a charge latent image from a recording member, comprising:

a photoconductive member opposed to the recording member;

means for applying a spot of light to the photoconductive member to reduce an electric resistance of a portion of the photoconductive member which is exposed to the light spot, wherein an electric field representing the charge latent image is efficiently guided by the resistance-reduced portion of the photoconductive member; and means for sensing the electric field guided by the resistance-reduced portion of the photoconductive member.

8. The system of claim 7 wherein the sensing means comprises:

a photo-modulation member exposed to the electric field guided by the resistance-reduced portion of the photoconductive member;

means for applying second light to the photo-modulation member; and means for sensing the second light which is outputted from the photo-modulation member.

9. The system of claim 7 wherein the sensing means comprises:

a sensing electrode exposed to the electric field guided by the resistance-reduced portion of the photoconductive member; and means for sensing a potential electrostatically induced on the sensing electrode.

* * * * *